(12) United States Patent
Halder et al.

(10) Patent No.: US 8,858,690 B2
(45) Date of Patent: Oct. 14, 2014

(54) THERMALLY INTEGRATED ADSORPTION-DESORPTION SYSTEMS AND METHODS

(75) Inventors: Amit Halder, Ithaca, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 246 days.

(21) Appl. No.: 13/216,679

(22) Filed: Aug. 24, 2011

(65) Prior Publication Data

US 2013/0047842 A1 Feb. 28, 2013

(51) Int. Cl.
*B01D 53/02* (2006.01)
*B01D 53/04* (2006.01)
*B01D 53/06* (2006.01)

(52) U.S. Cl.
CPC ...... *B01D 53/0438* (2013.01); *B01D 2257/504* (2013.01); *B01D 2256/16* (2013.01);

(Continued)

(58) Field of Classification Search
CPC ................... B01D 2253/102; B01D 2253/104; B01D 2253/106; B01D 2253/108; B01D 2253/204; B01D 2253/3425; B01D 2256/16; B01D 2256/245; B01D 2257/304; B01D 2257/504; B01D 2258/0283; B01D 2258/05
USPC ........ 95/26, 113, 121, 123, 136, 139; 96/115, 96/125, 143, 144, 153
See application file for complete search history.

(56) References Cited

U.S. PATENT DOCUMENTS 3,683,591 A * 8/1972 Glav .................................. 95/93
4,377,400 A * 3/1983 Okamoto et al. ................. 96/13

(Continued)

FOREIGN PATENT DOCUMENTS

EP 1081440 3/2001
EP 964601 9/2008

(Continued)

OTHER PUBLICATIONS

Lee, Jiang-Jae et al., "Heat-exchange pressure swing adsorption process for Hydrogen separation", AICHE Journal., vo. 54, No. 8, pp. 2054-2064, 2008.

(Continued)

*Primary Examiner* — Christopher P Jones
(74) *Attorney, Agent, or Firm* — Michael A. Hood

(57) ABSTRACT

High volumetric-efficiency thermally integrated systems for capturing a target gas from a process gas stream include a monolithic body and a distribution system. The monolithic body includes a first plurality of channels and a second plurality of channels each having sorbent surfaces that reversibly adsorb the target gas. The channels are in thermal communication such that heat from an exothermic adsorption of target gas in one plurality of channels is used by an endothermic desorption of target gas from the other plurality of channels. Methods for separating a target gas from a process gas stream include switching the high volumetric-efficiency thermally integrated systems between a first state and a second state. In the first state, the first plurality of channels undergoes desorption while the second undergoes adsorption. In the second state, the second plurality of channels undergoes desorption while the first plurality undergoes adsorption.

23 Claims, 7 Drawing Sheets

(52) U.S. Cl.
CPC .... *B01D 2253/204* (2013.01); *B01D 2253/104* (2013.01); *B01D 53/0446* (2013.01); *B01D 2258/06* (2013.01); *B01D 2253/106* (2013.01); *B01D 2256/245* (2013.01); *B01D 2258/05* (2013.01); *B01D 2253/102* (2013.01); *B01D 2253/3425* (2013.01); *B01D 2258/0283* (2013.01); *B01D 2253/108* (2013.01); *Y02C 10/08* (2013.01); *B01D 53/06* (2013.01); *B01D 2257/304* (2013.01)
USPC ........ 96/115; 95/26; 95/113; 95/121; 95/123; 95/136; 95/139; 96/125; 96/143; 96/144; 96/153

(56) References Cited

U.S. PATENT DOCUMENTS

| | | | | |
|---|---|---|---|---|
| 4,484,938 | A | * | 11/1984 | Okamoto et al. ............... 96/118 |
| 4,582,129 | A | * | 4/1986 | Yano et al. ...................... 96/118 |
| 6,273,938 | B1 | * | 8/2001 | Fanselow et al. ................. 95/90 |
| 6,379,437 | B1 | * | 4/2002 | Heinonen et al. .............. 96/135 |
| 6,478,855 | B1 | * | 11/2002 | Okano ............................ 95/113 |
| 6,482,375 | B1 | | 11/2002 | van der Wal et al. |
| 6,969,506 | B2 | | 11/2005 | Tonkovich et al. |
| 2002/0031455 | A1 | | 3/2002 | Hippel et al. |
| 2007/0009426 | A1 | | 1/2007 | Leveson |
| 2008/0282892 | A1 | | 11/2008 | Deckman et al. |
| 2009/0211441 | A1 | | 8/2009 | Reyes et al. |
| 2010/0043635 | A1 | | 2/2010 | Gueret et al. |
| 2010/0150812 | A1 | * | 6/2010 | Dunne et al. .................. 423/400 |
| 2010/0326272 | A1 | | 12/2010 | Asaro et al. |

FOREIGN PATENT DOCUMENTS

| | | |
|---|---|---|
| EP | 1964601 | 9/2008 |
| JP | 60129116 | 7/1985 |
| WO | 01/60741 A1 | 8/2001 |
| WO | 02/064248 A2 | 8/2002 |
| WO | 03/033958 A1 | 4/2003 |
| WO | 2010/151271 | 12/2010 |
| WO | 2013028815 | 2/2013 |

OTHER PUBLICATIONS

International Search Report, dated Oct. 19, 2012, pp. 1-6, International Patent Application No. PCT/US2012/051967, European Patent Office, The Netherlands.

Written Opinion of the International Searching Authority, dated Oct. 19, 2012, pp. 1-10, International Patent Application No. PCT/US2012/051967, European Patent Office, The Netherlands.

\* cited by examiner

THERMALLY INTEGRATED ADSORPTION-DESORPTION SYSTEMS AND METHODS

BACKGROUND

1. Field

The present specification generally relates to systems and methods for capturing a target gas from a process gas stream and, more particularly, to systems and methods for simultaneous adsorption and desorption of target gas in a thermally integrated manner.

2. Technical Background

Capture of a target gas from a process gas stream comprising one or more gases in addition to the target gas may be accomplished in a number of ways. For example, the capture of the target gas may involve first adsorbing the target gas onto a sorbent material. When the sorbent material is saturated, the target gas may be desorbed from the sorbent material, thereby regenerating the sorbent material for further use. Adsorption is an exothermic (i.e., energy-releasing) process, whereas desorption is an endothermic (i.e., energy-absorbing) process. Thus, adsorption processes respond favorably when low temperatures are maintained, whereas desorption processes respond favorably at increased temperatures. Thermal optimization of any system can be challenging when both adsorption and desorption processes occur within the same system.

Complex systems involving adsorption and desorption of a target gas may include heat exchangers that take away heat produced during the exothermic adsorption process. Then, to release the adsorbed target gas, a chemical potential may be created by increasing the adsorbent temperature (Temperature Swing Adjustment or TSA) or by reducing the partial pressure of the target gas in the surrounding atmosphere (Pressure Swing Adjustment or PSA). During the endothermic desorption process energy may be supplied to the adsorbent material through the heat exchanger, such as in a TSA process, or the temperature of the whole system may decrease if there is no external heat source, such as in a PSA process.

The fabrication of heat exchangers presents several manufacturing challenges, and associated processes involving heat exchangers are energy-intensive. For example, it is possible in a monolith-based system to make selected channel walls impermeable so that heat exchanger fluid is isolated from adsorbent layers. Such a configuration decreases efficiency by dedicating certain channels to coolant only. Moreover, external energy is required to pump coolant fluid and extract heat during adsorption, as well as to provide heat during desorption.

Accordingly, ongoing needs exist for alternative systems and methods for capturing target gases from a process gas stream.

SUMMARY

According to various embodiments, a high volumetric-efficiency thermally integrated system for capturing a target gas from a process gas stream is provided. The high volumetric-efficiency thermally integrated system may include a monolithic body and a distribution system. The monolithic body may include a first plurality of discrete channels through the monolithic body and a second plurality of discrete channels through the monolithic body. The first plurality of discrete channels and the second plurality of discrete channels are arranged such that individual channels of the first plurality of discrete channels are in thermal communication with individual channels of the second plurality of discrete channels. First partition walls of the first plurality of discrete channels and second partition walls of the second plurality of discrete channels comprise sorbent surfaces of a sorbent material that reversibly adsorbs the target gas from the process gas stream. The distribution system supplies the monolithic body with the process gas stream from a process gas source and a purge stream from a purge source. By action of the distribution system, the high volumetric-efficiency thermally integrated system switches between a first state and a second state. In the first state, the distribution system simultaneously supplies the process gas stream to the second plurality of discrete channels and the purge stream to the first plurality of discrete channels. In the second state, the distribution system simultaneously supplies the process gas stream to the first plurality of discrete channels and the purge stream to the second plurality of discrete channels.

According to further embodiments, methods for separating a target gas from a process gas stream include using a high volumetric-efficiency thermally integrated system having the monolithic body. The methods may include a priming step, wherein the process gas stream is introduced into the first plurality of discrete channels of the monolithic body so as to cause the target gas to adsorb into sorbent surfaces of the first plurality of discrete channels. Thereafter, a thermally integrated first stage may be performed, comprising three concurrent processes: (i) flowing the process gas stream through the second plurality of discrete channels of the monolithic body, so as to cause the target gas to adsorb exothermically into the sorbent surfaces of the second plurality of discrete channels; (ii) purging the first plurality of discrete channels with a flowing purge stream, so as to cause the target gas to desorb endothermically from the sorbent surfaces of the first plurality of discrete channels and enter into the flowing purge stream; and (iii) exhausting process gas exhaust from the second plurality of discrete channels and purge exhaust from the first plurality of discrete channels.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
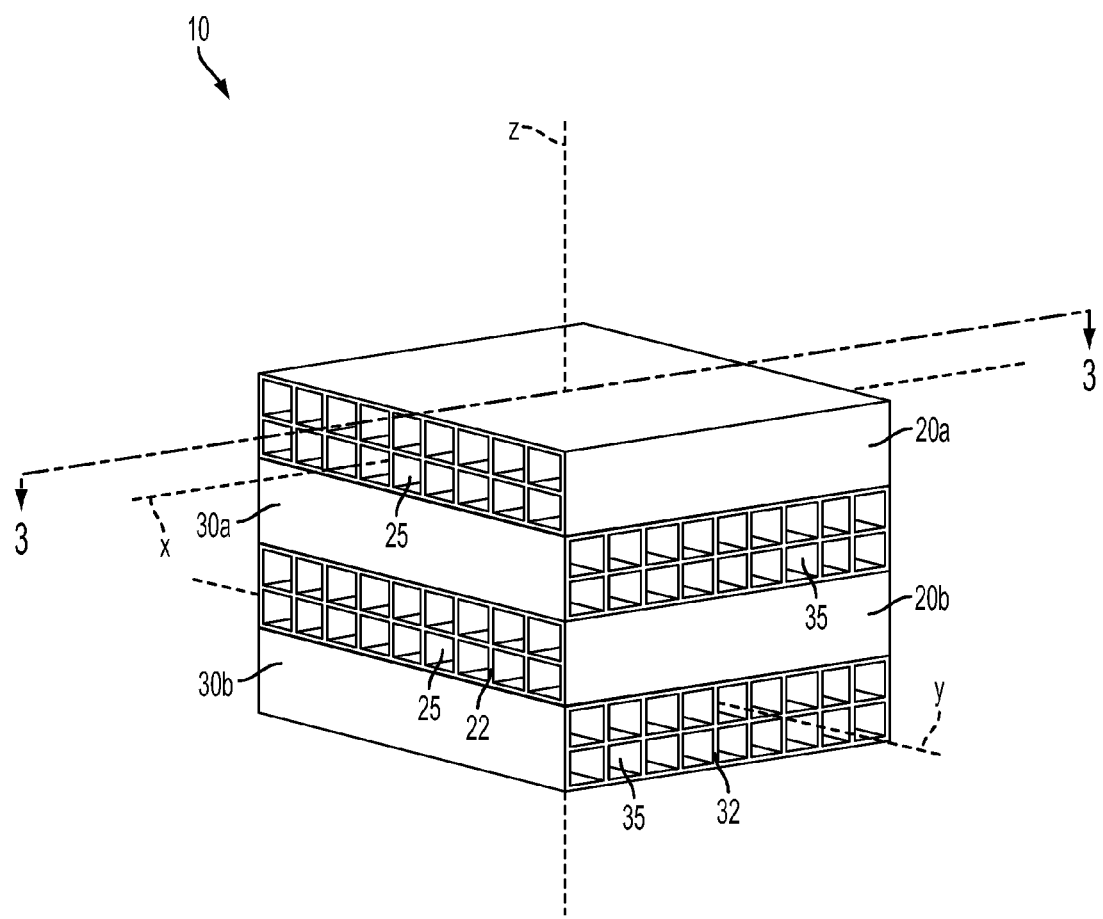
FIG. 1 is a perspective view of a monolithic body suitable as a component of high volumetric-efficiency thermally integrated systems according to embodiments described herein.

Reference will now be made in detail to embodiments of high volumetric-efficiency thermally integrated systems and methods for capturing a target gas from a process gas stream. The systems and methods are illustrated in the accompanying drawings. Whenever possible, the same reference numerals will be used throughout the drawings to refer to the same or like parts. FIG. 1 schematically depicts one embodiment of a monolithic body for use in a high volumetric-efficiency thermally integrated system for removing a target gas from a process gas stream. The monolithic body generally includes a first plurality of discrete channels through the monolithic body and parallel to a first flow axis of the monolithic body and a second plurality of discrete channels through the monolithic body and parallel to a second flow axis of the monolithic body. The partition walls of the channels include sorbent surfaces for adsorbing the target gas from the process gas stream. The monolithic body may be coupled to a distribution system to form the high volumetric-efficiency thermally integrated system which switches between a first state, in which the distribution system simultaneously supplies a process gas stream to the second plurality of discrete channels and a purge stream to the first plurality of discrete channels, and a second state, in which the distribution system simultaneously supplies the process gas stream to the first plurality of discrete channels and the purge stream to the second plurality of discrete channels. The high volumetric-efficiency thermally integrated system and methods for using the same to remove a target gas from a process gas stream will be described further herein with specific reference to the appended drawings.

A monolithic body 10 according to one embodiment is shown in FIG. 1. The monolithic body 10 in FIG. 1 comprises four stacked monoliths 20a, 20b, 30a, 30b. The four stacked monoliths 20a, 20b, 30a, 30b include two first monoliths 20a, 20b and two second monoliths 30a, 30b. A first plurality of discrete channels 25 extend through the two first monoliths 20a, 20b and, as such, also extend through the monolithic body 10 with openings on opposite ends of the monolithic body 10. In the monolithic body 10 shown in FIG. 1, individual channels of the first plurality of discrete channels 25 are parallel to each other and to a first flow axis x of the monolithic body 10. A second plurality of discrete channels 35 extend through the two second monoliths 30a, 30b and, as such, also extend through the monolithic body 10 with openings on opposite ends of the monolithic body 10. Though the monolithic body 10 is shown with having four stacked monoliths 20a, 20b, 30a, 30b, it will be understood that only one monolith, or any number of stacked monoliths could be present, such greater than 2, greater than 10, greater than 50, greater than 100, or greater than 1000.

In the embodiment of the monolithic body 10 shown in FIG. 1, individual channels of the first plurality of discrete channels 35 are parallel to each other and to a second flow axis y of the monolithic body 10. None of the individual channels of the first plurality of discrete channels 25 is in fluidic communication with any of the individual channels of the second plurality of discrete channels 35. It should be understood that the first flow axis x and the second flow axis y may or may not correspond to or be parallel to respective axes of symmetry of the monolithic body 10; rather, the first flow axis x and the second flow axis y designate lines of reference through the monolithic body 10, parallel to which flow paths of discrete channels are arranged.

As will be described in greater detail below, the monolithic body 10 illustrated in FIG. 1 may be incorporated into various high volumetric-efficiency thermally integrated systems and used with methods for capturing a target gas from a process gas stream. The high volumetric-efficiency thermally integrated systems may be configured, for example, as static systems or as dynamic systems. Dynamic systems and methods for their use may involve rotating the monolithic body 10. As such, it may be desirable in certain system configurations for the monolithic body 10 to be rotationally symmetric about a rotational axis z, such that when the monolithic body is rotated about the rotational axis z at increments of 90° or 180°, for example, faces or surfaces of the monolithic body 10 will line up with other components of the dynamic system. Though the monolithic body in FIG. 1 is rotationally symmetric in 90° increments around the rotational axis z, it should be understood that the monolithic body need not have identical dimensions along the first flow axis x and the second flow axis y.

Figure 2:
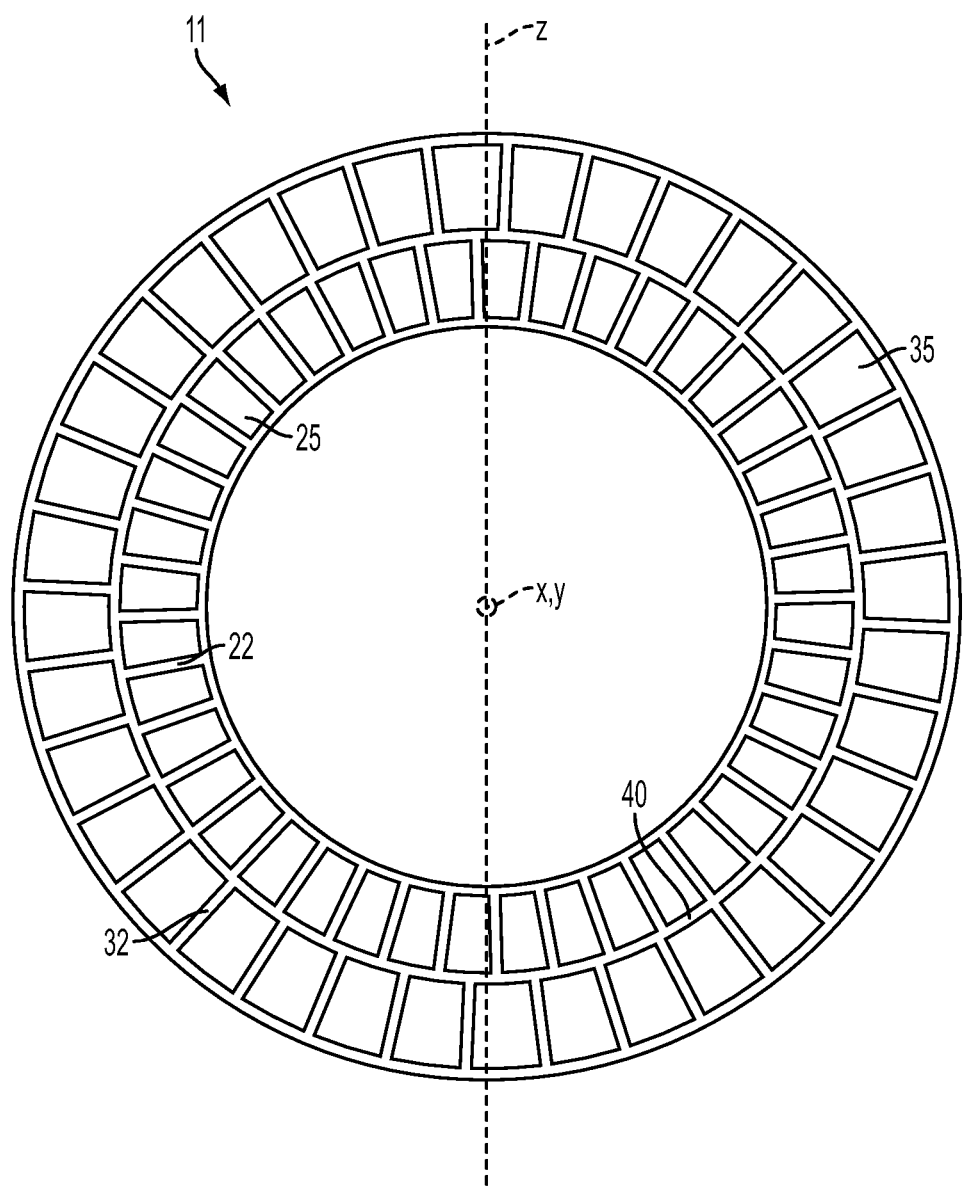
FIG. 2 is top plan view of an cylindrical monolithic body for use in a high volumetric-efficiency thermally integrated system according to one or more embodiments described herein.

A monolithic body according to an alternative embodiment is illustrated in FIG. 2. In this embodiment the monolithic body is cylindrical. The cylindrical monolithic body 11 may comprise a single cylindrical monolith or a plurality of cylindrical monoliths stacked end to end so that channels of the cylindrical monoliths are aligned. A first plurality of discrete channels 25, consists of the inner ring of channels in the cylindrical monolithic body 11. The first plurality of discrete channels 25 extend through the cylindrical monolithic body 11 with openings on opposite ends of the cylindrical monolithic body 11. The individual channels of the first plurality of discrete channels 25 are separated from each other by first partition walls 22 (of which, only one is identified in FIG. 2). A second plurality of discrete channels 35, consists of the outer ring of channels in the cylindrical monolithic body. The second plurality of discrete channels 35 extend through the cylindrical monolithic body 11 with openings on opposite ends of the cylindrical monolithic body 11. The individual channels of the second plurality of discrete channels 35 are separated from each other by second partition walls 32 (of which, only one is identified in FIG. 2). The individual channels of the first plurality of discrete channels 25 are separated from the individual channels of the second plurality of discrete channels 35 by separator walls 40 (of which, only one is identified in FIG. 2). Thus, direct thermal communication may be established among the first plurality of discrete channels 25 and the second plurality of discrete channels 35 through the separator walls 40. Direct thermal communication, as used herein, means that the transfer of heat occurs directly between a solid portion of the first plurality of discrete channels 25 and a corresponding solid portion of the second plurality of discrete channels 35 without passage of the heat through an additional medium such as an air gap, a cooling channel, or a coolant fluid interposed between the first body and the second body.

In the cylindrical monolithic body 11 shown in FIG. 2, individual channels of the first plurality of discrete channels 25 are parallel to each other and to a first flow axis x of the cylindrical monolithic body 11. Individual channels of the second plurality of discrete channels 35 are parallel to each other and to a second flow axis y of the cylindrical monolithic body 11. Thus, the first flow axis x and the second flow axis y of the cylindrical monolithic body 11 are the same and, as such, the individual channels of the first plurality of discrete channels and the second plurality of discrete channels define respective flow paths that all are parallel to each other. However, none of the individual channels of the first plurality of discrete channels 25 is in fluidic communication with any of the individual channels of the second plurality of discrete channels 35. When respective flow paths of the first plurality of discrete channels are parallel to respective flow paths of the second plurality of discrete channels, at any given time, gas flow through the discrete channels may be in a co-flow arrangement (i.e., in the same direction for all discrete channels) or a counter-flow arrangement (i.e., the flow in the first plurality of discrete channels is opposite the flow in the second plurality of discrete channels), as desired.

Like the monolithic body 10 in FIG. 1, the cylindrical monolithic body 11 illustrated in FIG. 2 may also be incorporated into various high volumetric-efficiency thermally integrated systems and methods for capturing a target gas from a process gas stream. To note, the cylindrical monolithic body 11 is symmetric with regard to a 180° rotation of the cylindrical monolithic body 11 about rotation axis z. As such, the cylindrical monolithic body 11 may be suitable for use in both static systems and dynamic systems described below in greater detail.

Though FIGS. 1 and 2 represent two embodiments of monolithic bodies, it should be understood that monoliths of other shapes and sizes can be used to construct a monolithic body having a first plurality of discrete channels and a second plurality of discrete channels in direct thermal communication with, but not in fluidic communication with, the first plurality of discrete channels. Additionally, the cross-sectional shapes of individual channels in the monolithic body are by no means limited to those depicted in FIGS. 1 and 2. Rather, the individual channels in the monolithic body may have any desirable cross-section including, without limitation, a rectangle, a square, a circle, an oval, a hexagon, a triangle, any regular or irregular polygon having from 3 to 20 sides, and combinations thereof. Preferably, the cross-sections of the individual channels are chosen to maximize the ratio of the cross-sectional area of the individual channels to the cross-sectional area of the monolithic body sliced in a direction perpendicular to the flow direction of the individual channels. As such, it should be readily understood that numerous space-filling options are possible such as, for example tessellation of one or more types of geometrically configured channels. As a further example, tessellated configurations of hexagonal individual channels are suitable in addition to the configurations shown in FIGS. 1 and 2.

Regardless of the shape of the monolithic body and the configuration of individual channels in the monolithic body, the monolithic body as a whole may be constructed from one or more monoliths made of any suitable material including, for example, glass, ceramics, non oxide ceramics (e.g., carbides, nitrides), carbon, alloys, metals, polymers, composites, and mixtures thereof. In general, the material may be non-porous or porous, provided any amount of porosity in the monolithic body or portions thereof is insufficient to enable fluidic communication between the individual channels of the first plurality of discrete channels and the individual channels of the second plurality of discrete channels formed in the monolithic body. Preferably, the monolithic body or portions thereof are fabricated from highly thermally conductive materials that increase the efficiency of thermal communication among one or more first groups of channels in which endothermic reactions are occurring at the same time as exothermic reactions are occurring in one or more second groups of channels.

Figure 3:
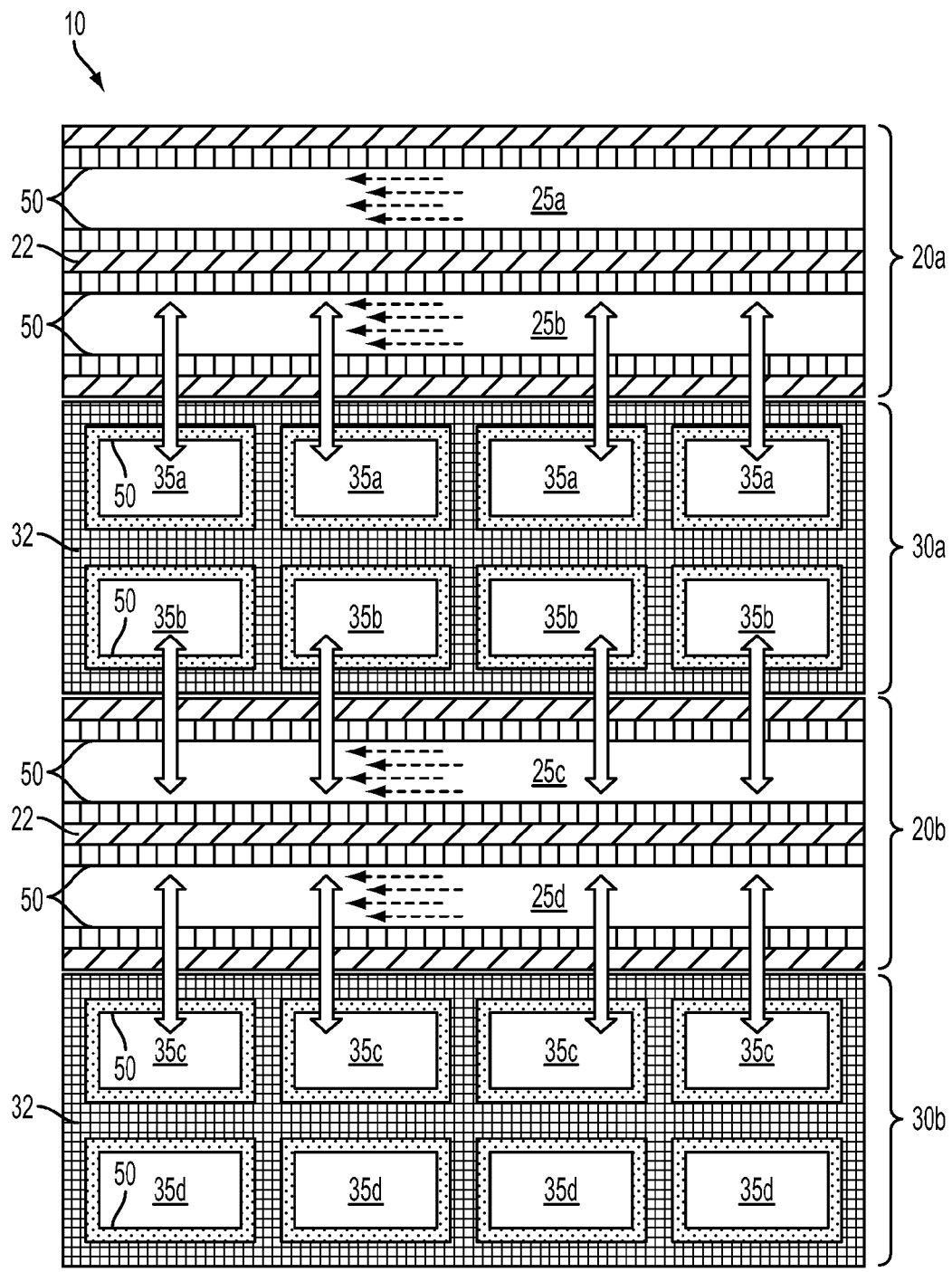
FIG. 3 is a cross-sectional plan view of the monolithic body of FIG. 1.

Referring to FIG. 3, a cross-section of the monolithic body 10 shown in FIG. 1 is provided to illustrate additional details of the high volumetric-efficiency thermally integrated systems and methods for capturing a target gas from a process gas stream. As illustrated in FIGS. 1 and 3, the four stacked monoliths 20a, 30a, 20b, 30b together compose the monolithic body 10. The discrete channels 25a, 25b in first monolith 20a and the discrete channels 25c, 25d in first monolith 20b all define flow paths along first flow axis x (see FIG. 1), shown as horizontally oriented in FIG. 3. The discrete channels 35a, 35b in second monolith 30a and the discrete channels 35c, 35d in second monolith 30b all define flow paths extending into the plane of FIG. 3 (i.e., along second flow axis y in FIG. 1). First partition walls 22 separate individual discrete channels 25a, 25b, 25c, 25d in the two first monoliths 20a, 20b. Second partition walls 32 separate individual discrete channels 35a, 35b, 35c, 35d in the two second monoliths 30a, 30b. Though the discrete channels of the monolithic body 10 in FIGS. 1 and 3 are depicted with particular orientations and are perpendicular with each other, it should be understood that these orientations are meant to be illustrative only and not limiting.

Referring to FIGS. 1 and 3, the monolithic body 10 comprises a first plurality of discrete channels through the monolithic body 10. The first plurality of discrete channels includes the discrete channels 25a, 25b in first monolith 20a and the discrete channels 25c, 25d in first monolith 20b. The monolithic body 10 further comprises a second plurality of discrete channels through the monolithic body 10. The second plurality of discrete channels includes the discrete channels 35a, 35b in second monolith 30a and the discrete channels 35c, 35d in second monolith 30b. The individual channels of the first plurality of discrete channels 25a, 25b, 25c, 25d are not in fluidic communication with any individual channels of the second plurality of discrete channels 35a, 35b, 35c, 35d.

First plurality of discrete channels 25a, 25b, 25c, 25d and second plurality of discrete channels 35a, 35b, 35c, 35d may be arranged such that individual channels of the first plurality of discrete channels 25a, 25b, 25c, 25d are in direct thermal communication with individual channels of the second plurality of discrete channels 35a, 35b, 35c, 35d. An exemplary embodiment of direct thermal communication is illustrated in FIG. 3 with double-headed arrows between channel 25b and channels 35a, between channel 25c and channels 35b, and between channel 25d and channels 35c, indicating possible heat flow directions between the channels. Thermal communication among these channels can be direct thermal communication in the sense that heat transfers from a channel belonging to the first plurality of discrete channels 25a, 25b, 25c, 25d into one or more channels belonging to the second plurality of discrete channels 35a, 35b, 35c, 35d by passing through solid objects only. In such an embodiment, the heat transfers through first partition walls 22 and second partition walls 32 only, without passing through an additional medium such as an air gap, a cooling channel, or a coolant fluid interposed between the channels. Of course, it will be understood that the direct thermal communication pathways depicted in FIG. 3 are not the only possible pathways that describe the direct thermal communication. Rather, the direct thermal communication pathways illustrate a mechanism by which heat liberated by exothermic processes in one plurality of discrete channels and heat absorbed by endothermic processes in the other plurality of discrete channels can be used synergistically to improve the efficiency of the high volumetric-efficiency thermally integrated systems described herein.

Referring to FIG. 3, first partition walls 22 of the first plurality of discrete channels 25a, 25b, 25c, 25d and second partition walls 32 of the second plurality of discrete channels 35a, 35b, 35c, 35d comprise sorbent surfaces 50. The sorbent surfaces 50 may comprise a sorbent material that reversibly adsorbs a target gas, generally from a process gas stream comprising the target gas along with additional gases. For example, the sorbent material may reversibly adsorb carbon dioxide or hydrogen sulfide from a process gas stream comprising carbon dioxide and one or more additional gases such as methane, nitrogen, or hydrogen. As used herein, "reversibly adsorb a target gas from a process gas stream" means that the sorbent material can adsorb the target gas from the process gas stream at a first set of operational parameters (for example, a temperature, a total pressure, and/or a partial pressure of the target gas) and that the adsorbed target gas can be made to desorb from the sorbent material by changing to a second set of operational parameters (for example, by raising the temperature, decreasing the total pressure, and/or decreasing the partial pressure of the target gas). In non-limiting embodiments, the process gas stream may be, for example, natural gas, flue gas, air, biogas, a water gas-shift mixture from a hydrogen gas production process, and exhaust gas from a combustion process. In further non-limiting embodiments, the target gas may be carbon dioxide or hydrogen sulfide that is present in a process gas stream of natural gas or flue gas, for example.

In some embodiments, the sorbent surfaces 50 may comprise a sorbent material that is different from the material from which the monolithic body 10 is made. In such embodiments, the sorbent material may be applied to the monolithic body 10 by known methods such as washcoating, for example, whereby the sorbent surfaces 50 are coatings. Such coatings may have any practical thickness such as from 10 μm to 5000 μm, from 100 μm to 2000 μm, or from 200 μm to 1000 μm, depending on the dimensions of the discrete channels and the desired adsorption capacity of the monolithic body 10 for the target gas. Alternatively, in other embodiments, the monolithic body 10 itself may be constructed entirely from a suitable sorbent material. In this case, the sorbent surfaces 50 are simply exposed surfaces of the partition walls within the discrete channels, because the partition walls themselves are part of the monolithic body 10 and, as such, comprise the sorbent material from which the monolithic body 10 is constructed.

Suitable sorbent materials that may be washcoated onto the monolithic body 10 include, as non-limiting examples, zeolites, zeolitic imadazole framework, metallic organic framework, carbon, mesoporous alumina and silicas including SBA-15 and analogs, combinations of any of the above materials, and any of the above materials functionalized with an amine or an amino group.

Suitable sorbent materials from which the monolithic body 10 may be constructed include, as non-limiting examples, zeolites, carbon, zeolitic imadazole framework, metallic organic framework, carbon, mesoporous alumina and silicas including SBA-15 and analogs, and combinations of the above materials. If the target gas is carbon dioxide, for example, particularly suitable sorbent materials include, as non-limiting examples, zeolites, zeolitic imadazole framework, metallic organic framework, carbon, mesoporous alumina and silicas including SBA-15 and analogs, combination of the above materials, and any of the above materials functionalized with an amine or amino group.

As will be described below, any suitable configuration of a monolithic body may be incorporated into various configurations of high volumetric-efficiency thermally-integrated systems and methods used for capturing a target gas from a process gas stream. It will be understood that the monolithic body 10 of FIG. 1 and the cylindrical monolithic body 11 of FIG. 2 are simply two specific embodiments of the type of monolithic body that is suitable for such systems and methods and that other types of monolithic body may be used in the systems and methods. However, to illustrate the operative principles of the high volumetric-efficiency thermally-integrated systems and methods including a monolithic body in the form of specific embodiments, only one particular type of monolithic body is shown, in particular one resembling monolithic body 10 from FIGS. 1 and 3. Accordingly, it should be understood that the systems described herein are illustrated through only a single type of monolithic body and that aspects such as direct thermal communication will be common to any type of monolithic body that may be used in the embodiments of the systems and methods described herein.

High volumetric-efficiency thermally-integrated systems and methods for removing a target gas from a process gas stream now will be described with reference to two specific embodiments. Though many alternative embodiments and variations of the specific embodiments may exist, the two specific embodiments may include a static system 100, shown in FIG. 4, and a dynamic system 101, shown in FIGS. 5A and 5B.

Figure 4:
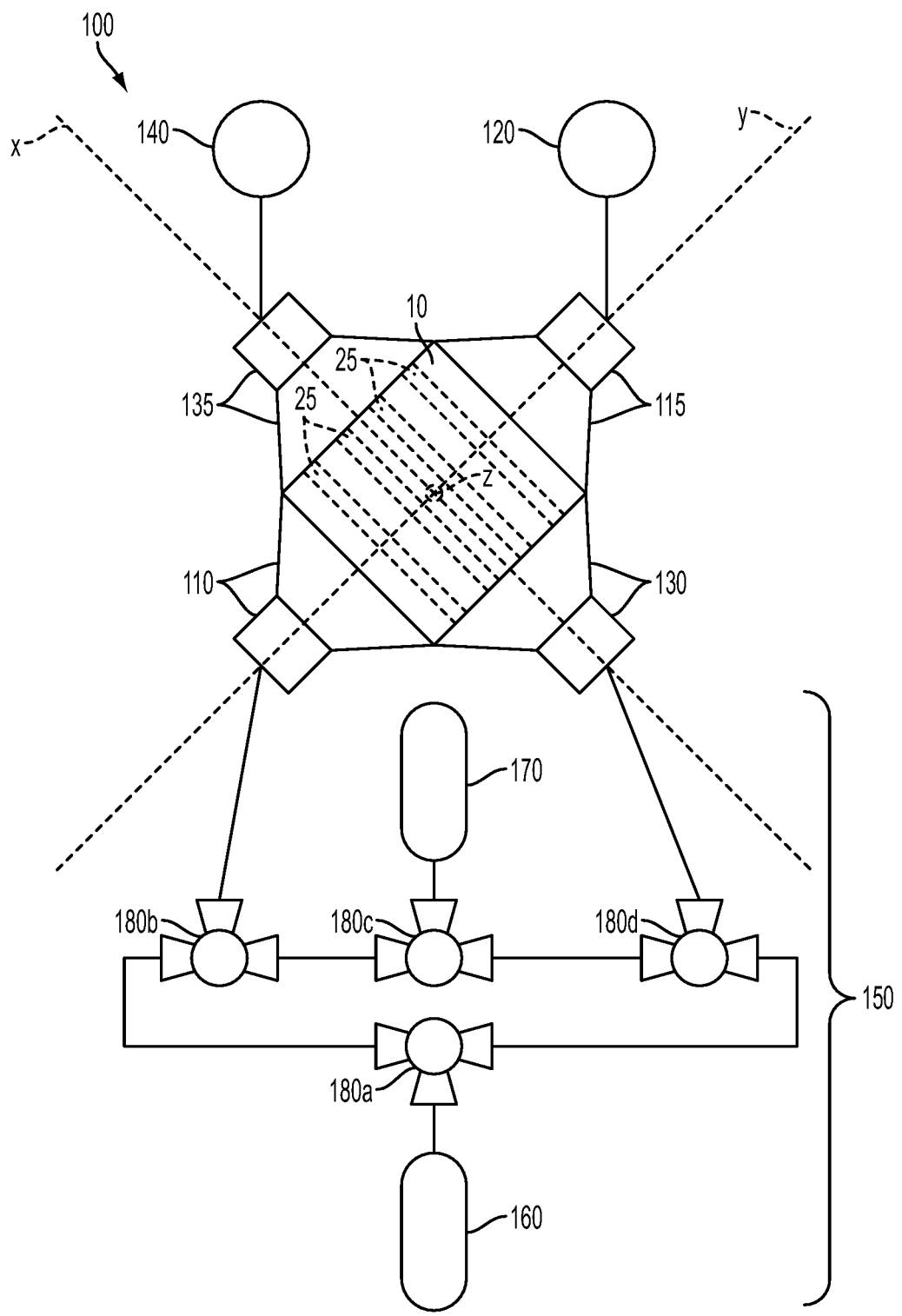
FIG. 4 schematically depicts a high volumetric-efficiency thermally integrated system configured as a static system, according to embodiments described herein.

Referring first to FIG. 4, one embodiment of a high volumetric-efficiency thermally-integrated system is shown as static system 100. The static system 100 comprises a monolithic body 10 and a distribution system 150. The monolithic body 10 in the static system 100 comprises all the structural elements described with respect to the monolithic body 10 in FIGS. 1 and 3. However, the monolithic body in FIG. 4 is viewed from the top such that all the discrete channels therein are not visible. For purposes of illustration, the first plurality of discrete channels 25 are shown in dashed lines in FIG. 4. Here, the first plurality of discrete channels in the monolithic body 10 each are parallel to the first flow axis x and establish fluidic communication between a second inlet manifold 130 and a second outlet manifold 135. Similarly, the second plurality of discrete channels in the monolithic body 10 each are parallel to the second flow axis y and establish fluidic communication between a first inlet manifold 110 and a first outlet manifold 115.

The first inlet manifold 110 and the second inlet manifold 130 are configured with respect to the monolithic body 10 as any suitable structure that directs and distributes flow of a process gas stream or a purge stream into the discrete channels in the monolithic body 10 aligned about a particular flow axis. Likewise, the first outlet manifold 115 and the second outlet manifold 135 are configured with respect to the monolithic body 10 as any suitable structure that directs flow of the process gas stream or the purge stream exiting from the discrete channels in the monolithic body 10 into a suitable conduit or other exhausting means. The first outlet manifold 115 is in fluidic communication with a first exhaust system 120, and the second outlet manifold 135 is in fluidic communication with a second exhaust system 140.

Though the top view of the monolithic body 10 in FIG. 4 shows the top of the monolithic body as square in cross-section, consistent with FIG. 1, the square shape is intended to be illustrative and not limiting. It will be understood that other geometric shapes of the monolithic body 10 are contemplated and that the other geometric shapes can be incorporated into analogous high volumetric-efficiency thermally-integrated systems having the same structural features described below. For example, the monolithic body 10 may have a width along first flow axis x that is different from the length along second flow axis y. In alternative embodiments, the monolithic body 10 shown in FIG. 4 may be replaced with a cylindrical monolithic body 11 (see FIG. 2), and the manifolds 110, 115, 130, 135 may be reconfigured to accommodate the cylindrical monolithic body.

The static system 100 further comprises a distribution system 150. The distribution system 150 supplies the monolithic body 10 with a process gas stream from a process gas source 160 and a purge stream from a purge source 170. As non-limiting examples, the process gas source 160 may comprise a vessel such as a pressurized tank, an apparatus such as a pump, an open conduit attached to a pressurized source such as a natural gas well, or a combination of any of these. The purge source 170 also may comprise any suitable vessel that supplies a purge stream of a purge gas including, for example, a pressurized tank. Whereas the type of process gas source 160 used may be highly dependent on the desired application of the static system 100, the purge source 170 typically comprises a vessel for supplying a known purge gas. It will be apparent that numerous variations and adaptations may be made to the distribution system 150 shown in FIG. 4 without changing the operative principles of the distribution system 150.

The static system 100 is capable of switching between a first state and a second state. In the first state, the distribution system 150 simultaneously supplies the process gas stream from the process gas source 160 to the second plurality of discrete channels (parallel to second flow axis y) through the first inlet manifold 110 and the purge stream from the purge source 170 to the first plurality of discrete channels (parallel to first flow axis x) through the second inlet manifold 130. In the second state, the distribution system 150 simultaneously supplies the process gas stream from the process gas source 160 to the first plurality of discrete channels and the purge stream from the purge source 170 to the second plurality of discrete channels.

Switching from the first state to the second state or from the second state to the first state in the static system 100 shown in FIG. 4 may be accomplished, for example, by one or more switching valves, exemplified as process gas-source switching valve 180a, first-inlet-manifold switching valve 180b, purge-source switching valve 180c, and second-inlet-manifold switching valve 180d.

Each of the exemplified switching valves 180a, 180b, 180c, 180d may be independently operable in two states that can be controlled by a suitable control apparatus (not shown). For example, the process gas-source switching valve 180a may place the process gas source 160 in fluidic communication with the first-inlet-manifold switching valve 180b in a first state and with the second-inlet-manifold switching valve 180d in a second state. The purge-source switching valve 180c may place the purge source 170 in fluidic communication with the second-inlet-manifold switching valve 180d in a first state and with the first-inlet-manifold switching valve 180b in a second state. The first-inlet-manifold switching valve 180b may place the first inlet manifold 110 in fluidic communication with the process gas-source switching valve 180a in a first state and with the purge-source switching valve 180c in a second state. The second-inlet-manifold switching valve 180d may place the second inlet manifold 130 in fluidic communication with the purge-source switching valve 180c in a first state and with the process gas-source switching valve 180a in a second state.

In this manner, when all of the exemplified switching valves 180a, 180b, 180c, 180d are in their respective first states, the static system 100 operates in its first state, wherein the process gas stream is supplied from the process gas source 160 to the second plurality of discrete channels through the first inlet manifold 110 while the purge stream is supplied from the purge source 170 to the first plurality of discrete channels through the second inlet manifold 130. Likewise, when all of the exemplified switching valves 180a, 180b, 180c, 180d are in their respective second states, the static system 100 operates in its second state, wherein the purge stream is supplied from the purge source 170 to the second plurality of discrete channels via the first inlet manifold 110 while the process gas stream is supplied from the process gas source 160 to the first plurality of discrete channels via the second inlet manifold 130.

When the static system 100 is in its first state, the gas stream reaching the first exhaust system 120 is the process gas stream, less any amount of target gas that was adsorbed in the monolithic body 10. Also in the first state of the static system 100, the gas stream reaching the gas stream reaching the second exhaust system 140 is a concentrated stream of target gas formed by the desorption of the target gas from the monolithic body 10 into the flowing purge stream. However, while the static system 100 is in its second state, the process gas stream reaches the second exhaust system 140 and the concentrated stream of target gas reaches the first exhaust system 120. As such, the first exhaust system 120 and the second exhaust system 140 may comprise additional switchable mechanisms (not shown) for collecting, recycling, or exhausting to the atmosphere the gas stream that arrives at the exhaust system, depending on whether the static system 100 is in its first state or its second state.

The high volumetric-efficiency thermally-integrated system shown as static system 100 in FIG. 4 is static in the sense that switching between the first state and the second state occurs through only the switching of the exemplified switching valves 180a, 180b, 180c, 180d, without any reorientation of the monolithic body 10. A variation of the static system of FIG. 4 is shown through the high volumetric-efficiency thermally-integrated system depicted in FIGS. 5A and 5B as a dynamic system 101. All structural elements of the dynamic system 101 have equivalent functions to corresponding structural elements in the static system 100 (FIG. 4), except that in the dynamic system 101, the purge source 170 is always in fluidic communication with the second inlet manifold 130, and the process gas source 160 is always in fluidic communication with the first inlet manifold 110. Additionally, each of the manifolds 110, 115, 130, 135 in the dynamic system 101 may comprise suitable structures, such as baffle walls 190, for example, that prevent leakage of flowing gases around corners of the monolithic body 10.

Figure 5A:
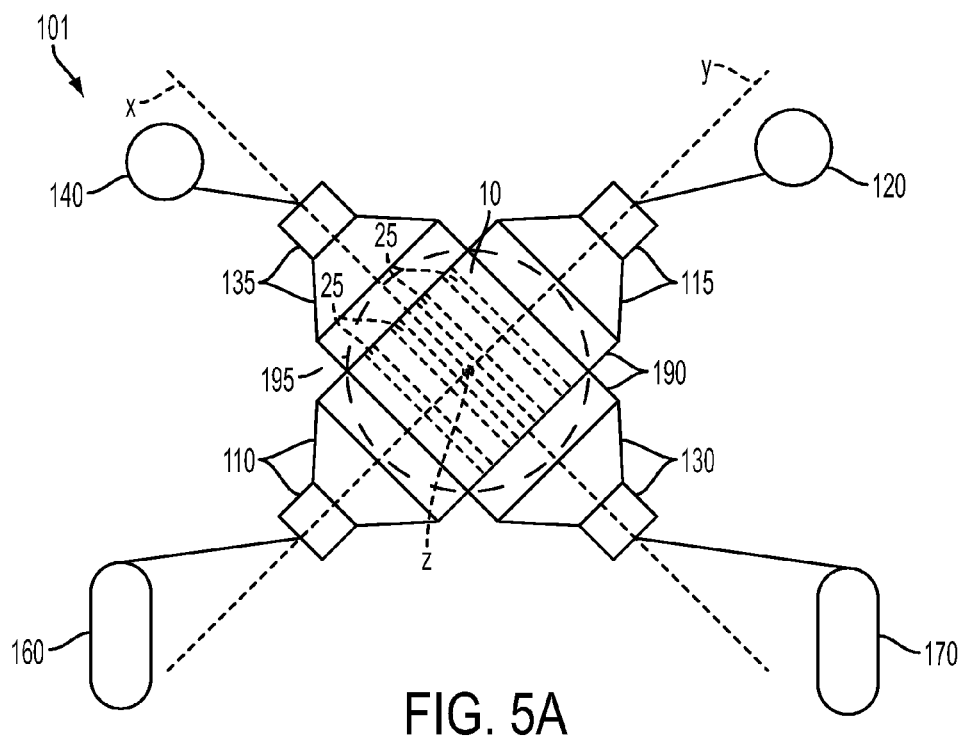
FIG. 5A schematically depicts a high volumetric-efficiency thermally integrated system configured as a dynamic system having a rotatable monolithic body, according to one or more embodiments described herein.
Figure 5B:
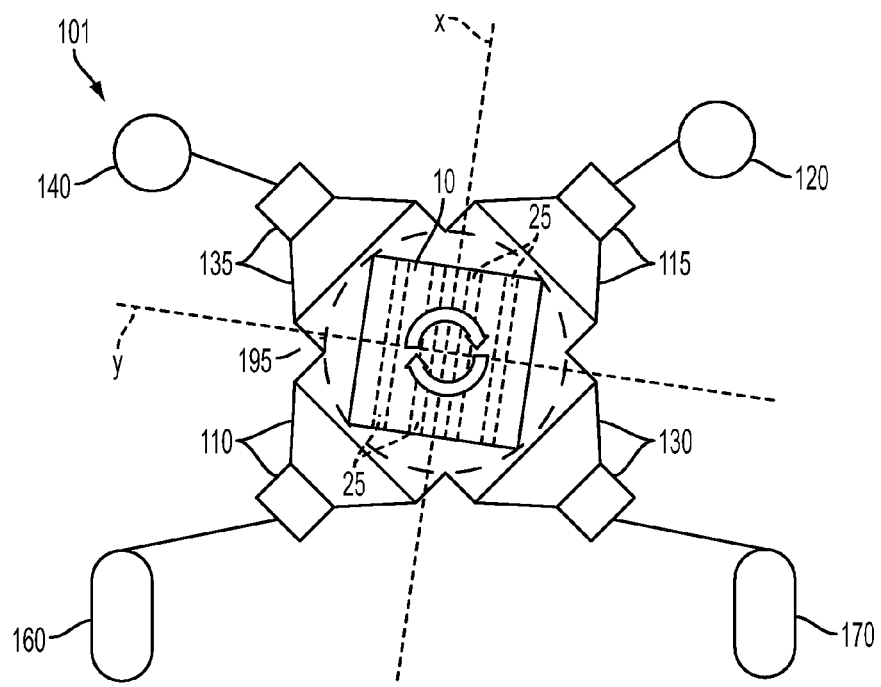
FIG. 5B schematically depicts the dynamic system of FIG. 5A during a switching operation from a first state to a second state, during which the monolithic body is rotated.

It is contemplated that the configuration of the dynamic system 101 may be facilitated and simplified by choosing a monolithic body 10 having a rotationally symmetric shape about rotational axis z. For example, monolithic body 10 in FIGS. 5A and 5B is shown with a square top, such that the width of the monolithic body 10 along the first flow axis x is equal to its length along the second flow axis y. It should be understood, however, that such a 4-fold rotational symmetry of the monolithic body need not be present, provided the manifolds 110, 115, 130, 135 can accommodate the actual geometry of the monolithic body 10. In an alternative embodiment, for example, the monolithic body could have 2-fold rotational symmetry to enable 180° rotation of the monolithic body in the dynamic system 101. For example, a 2-fold rotational symmetry would be present in a cylindrical monolithic body 11 (see FIG. 2) or in a cubic or rectangular monolithic body in which all discrete channels of the first and second pluralities of channels are parallel to each other.

The distribution system of the dynamic system 101 is not specifically labeled in FIGS. 5A and 5B. However, the distribution system in the dynamic system 101 may comprise the process gas source 160, the purge source 170, and a rotational mechanism (not shown). The rotational mechanism may comprise any suitable mechanical apparatus adapted to rotate the monolithic body 10 about rotational axis z (shown perpendicular to the plane of FIG. 5A at the intersection of first flow axis x and second flow axis y). The rotational mechanism may be a rotating table or pillar, for example, and may be bonded or joined to the monolithic body 10 or may be configured to rotate the monolithic body 10 by surface friction. Thus, the dynamic system 101 is differentiable from the static system of FIG. 4 in that the monolithic body 10 is rotatable. To accommodate for the rotation of the monolithic body, each of the manifolds 110, 115, 130, 135 preferably have a suitable contour that provides clearance of the edges of the monolithic body 10 as far as the outer clearance ring 195 (shown in dotted lines) of the monolithic body 10. In FIG. 5A, the baffle walls 190 are configured to intersect with outer clearance ring 195, such that when edges of the monolithic body 10 contact the baffle walls 190, leakage of flowing gases around corners of the monolithic body 10 is prevented.

In FIG. 5A, the first state of the dynamic system 101 is shown, wherein the process gas stream is supplied from the process gas source 160 to the second plurality of discrete channels (parallel to second flow axis y) through the first inlet manifold 110 and the purge stream is supplied from the purge source 170 to the first plurality of discrete channels (parallel to first flow axis x) through the second inlet manifold 130.

In FIG. 5B, the dynamic system 101 is shown during a switching operation from the first state to the second state. During the switching operation, the monolithic body 10 is rotated until the first plurality of discrete channels (aligned with the first flow axis x) are placed in fluidic communication with the first inlet manifold 110 and the second plurality of discrete channels (aligned with the second flow axis y) are placed in fluidic communication with the second inlet manifold 130. Though not shown, the second state of the dynamic system has the same configuration as the first state shown in FIG. 5A, except the first flow axis x and the second flow axis y are interchanged with each other. It should be understood that, though a clockwise rotation is shown in FIG. 5B, a counterclockwise rotation will produce the same result. Moreover, further switching from the second state back to the first state may occur either by continuing to rotate the monolithic body 10 in the same direction (clockwise as shown) or by rotating the monolithic body 10 in the opposite direction (i.e., counterclockwise).

Unlike in the static system 100 (FIG. 4), in both the first state and the second state of the dynamic system 101, the gas stream reaching the first exhaust system 120 is always the process gas stream, less any amount of target gas that was adsorbed in the monolithic body 10. Similarly, in both the first state and the second state of the dynamic system 101, the gas stream reaching the second exhaust system 140 is always a concentrated stream of target gas formed by the desorption of the target gas from the monolithic body 10 into the flowing purge stream. Thus, the additional complexity over the static system 100 required from including a rotational mechanism in the dynamic system 101 may be offset somewhat by the reduced complexity in the handling of the exhaust systems 120, 140 in the dynamic system 101. The exhaust systems 120, 140 of the dynamic system 101 may further comprise additional mechanisms (not shown) for collecting, recycling, or exhausting to the atmosphere the gas stream that arrives at the exhaust system. Advantageously, in the dynamic system 101 these additional mechanisms need not be switchable, unlike in the static system 100.

According to some embodiments, methods for separating a target gas from a process gas stream may comprise using a high volumetric-efficiency thermally integrated system such as the static system 100 (FIG. 4) or the dynamic system 101 (FIGS. 5A and 5B). Because the high volumetric-efficiency thermally integrated systems incorporate a monolithic body, as described above in detail, they advantageously may be assembled in a modular manner that enables them to be readily moved as necessary. For example, if the high volumetric-efficiency thermally integrated system is used at a natural gas well, and the well should run dry, the high volumetric-efficiency thermally integrated system can be easily moved to a different well. Modularity of this kind is not practical with other types of systems such as those using packed beds, for example.

Methods for removing a target gas from a process gas stream using the monolithic bodies and systems of FIGS. 3-5B above will now be described. Except as indicated otherwise, embodiments of the methods described herein are applicable to both the static system 100 (FIG. 4) and the dynamic system 101 (FIGS. 5A and 5B), described in detail above. With regard to the embodiments of the methods, unless indicated otherwise, structural part-number references are made to any of FIGS. 1-4, 5A, and 5B. Methods of removing a target gas from a process gas stream according to some embodiments may comprise first flowing the process gas stream through a first plurality of discrete channels 25 formed in the monolithic body 10, so as to cause the target gas to adsorb into sorbent surfaces 50 of the first plurality of discrete channels 25. The process gas stream contains a process gas concentration of the target gas. The actual process gas concentration may vary, depending on the application in which the high volumetric-efficiency thermally integrated system is used. For example, the process gas concentration of carbon dioxide in a process gas stream derived from a process gas source such as a natural gas well may range from about 1 mol. % to about 40 mol. %, more commonly from about 5 mol. % to about 20 mol. % such as, for example, about 12 mol. %. This first step is effectively a priming step and is conducted under the assumption that none of the discrete channels in the monolithic body 10 have been exposed to the target gas and that, therefore, no target gas needs to be purged from any portion of the monolithic body.

After the initial adsorption of the target gas into sorbent surfaces 50 of the first plurality of discrete channels 25, a thermally integrated first stage is performed for a first cycle time. The thermally integrated first stage comprises three simultaneous actions, during all of which a static system 100 or a dynamic system 101 is in its first state, as described above.

In the first simultaneous action, the process gas stream is caused to flow through a second plurality of discrete channels 35 formed in the monolithic body 10, so as to cause the target gas to adsorb exothermically into sorbent surfaces 50 of the second plurality of discrete channels 35. The second plurality of discrete channels 35 and the first plurality of discrete channels 25 are arranged such that individual channels 35a, 35b, 35c, 35d of the second plurality of discrete channels 35 are in thermal communication with individual channels 25a, 25b, 25c, 25d of the first plurality of discrete channels 25. The second plurality of discrete channels 35 are not in fluidic communication with any of the first plurality of discrete channels 25.

In the second simultaneous action, the first plurality of discrete channels 25 are purged with a flowing purge stream of a purge gas, so as to cause the target gas to desorb endothermically from the sorbent surfaces 50 of the first plurality of discrete channels 25 and enter into the flowing purge stream. The purge stream is typically an inert gas such as air or nitrogen and has a purge concentration of target gas. Preferably, the purge concentration is initially as low as possible, such as less than 5 mol. %, less than 1 mol. %, less than 0.1 mol. %, less than 0.01 mol. %, or even 0 mol. %. Generally, the purge concentration must be lower than the process gas concentration.

In the third simultaneous action, process gas exhaust is exhausted from the second plurality of discrete channels 35 and purge exhaust is exhausted from the first plurality of discrete channels 25. When the sorbent surfaces 50 in the monolithic body 10 are optimally selective to the target gas over the other components in the process gas stream, the process gas exhaust may comprise all components of the process gas stream except the target gas. Preferably, the process gas exhaust contains less than 5 mol. %, less than 1 mol. %, less than 0.1 mol %, or even 0 mol. % of the target gas. The purge exhaust contains highly concentrated target gas that has desorbed from the first plurality of discrete channels 25 during the second simultaneous action (i.e., the purging action). For example, the purge exhaust may comprise greater than 25 mol. %, greater than 50 mol. %, or greater than 75 mol. % of the target gas, mixed with the original purge gas. As such, the concentrated target gas may advantageously be collected if desired.

The three simultaneous actions described above are thermally integrated, as evidenced by a synergy among the first plurality of discrete channels 25 and the second plurality of discrete channels 35. Namely, because direct thermal communication occurs between the first plurality of discrete channels 25 and the second plurality of discrete channels 35, heat liberated from the exothermic adsorption occurring in the second plurality of discrete channels 35 is conducted to the first plurality of discrete channels 25 and, thereby, may increase the efficiency of the endothermic desorption occurring simultaneously in the first plurality of discrete channels 25. Conversely, heat absorbed away from the first plurality of discrete channels 25, and into the endothermic desorption process in the second plurality of discrete channels 35, increases efficiency of the exothermic adsorption process occurring within the first plurality of discrete channels 25. As such, the temperature in the first plurality of discrete channels 25 does not continue to increase into a regime where desorption is more thermodynamically favorable than adsorption, and the temperature in the second plurality of discrete channels 35 does not continue to decrease into a regime where adsorption is more thermodynamically favorable than desorption.

The thermally integrated first stage is performed for a first cycle time. The first cycle time may be determined from empirical determinations or from simulations of the high volumetric-efficiency thermally integrated system, either of which may be performed in advance of the methods described herein. Alternatively, one or more suitable type of control apparatus may be incorporated into the high volumetric-efficiency thermally integrated system. As a non-limiting example, the suitable control apparatus may comprise one or more detector that is sensitive to the target gas, for example. Such control apparatus may be configured and adapted to monitor the concentration of target gas in the process gas stream that emerges from the discrete channels that are in fluidic communication with the process gas source. A sharp increase in the concentration of target gas in this emerging process gas stream would indicate that the sorbent surfaces 50 of the applicable discrete channels are saturated with target gas. Thus, when the sharp increase is recognized by the control apparatus at a first breakthrough time, the first cycle time expires. Preferably, when a pattern is noted as to how long the first cycle time typically lasts, a first cycle time is fixed as slightly shorter in duration than the first breakthrough time, so as to avoid any spillover of target gas into an emerging process gas stream that otherwise contains only a small amount or even a zero concentration of target gas.

When the first cycle time expires, both the static system 100 and the dynamic system 101 may be switched from their first state to their second state, and the methods described herein may further comprise performing a thermally integrated second stage for a second cycle time. The thermally integrated second stage comprises three simultaneous actions, during all of which a static system 100 or a dynamic system 101 is in its second state, as described above.

The first simultaneous action of the thermally integrated second stage comprises flowing the process gas stream through the first plurality of discrete channels 25, so as to cause the target gas to adsorb exothermically into the sorbent surfaces 50 of the first plurality of discrete channels 25. The second simultaneous action comprises purging the second plurality of discrete channels 35 with a flowing purge stream, so as to cause the target gas to desorb endothermically from the sorbent surfaces 50 of the second plurality of discrete channels 35 and enter into the flowing purge stream. The third simultaneous action comprises exhausting a process gas exhaust from the first plurality of discrete channels 25 and a purge exhaust from the second plurality of discrete channels 35. The second cycle time, relative to a second breakthrough time, may be chosen or determined as described above with respect to the first cycle time.

The method of removing a target gas from a process gas stream may further comprise cycling between the thermally integrated first stage and the thermally integrated second stage, whereby the cycling may comprise, in sequence: (1) performing the thermally integrated first stage for the first cycle time with the high volumetric-efficiency thermally integrated system in its first state; (2) switching the high volumetric-efficiency thermally integrated system from its first state to its second state, such as by switching switchable valves of the static system 100 or by rotating the monolithic body 10 of the dynamic system 101 about a rotational axis z perpendicular to the first flow axis x and the second flow axis y to place the first plurality of discrete channels 25 in fluidic communication with the process gas source 160 and to place the second plurality of discrete channels 35 in fluidic communication with the purge source 170; (3) performing the thermally integrated second stage for the second cycle time; (4) switching from the second state to the first state, such as by switching switchable valves of the static system 100 or by rotating the monolithic body 10 of the dynamic system 101 about the rotational axis z to place the second plurality of discrete channels 35 in fluidic communication with the process gas source 160 and to place the first plurality of discrete channels 25 in fluidic communication with the purge source 170; and (5) repeating steps (1)-(4) at least once.

Figure 6:
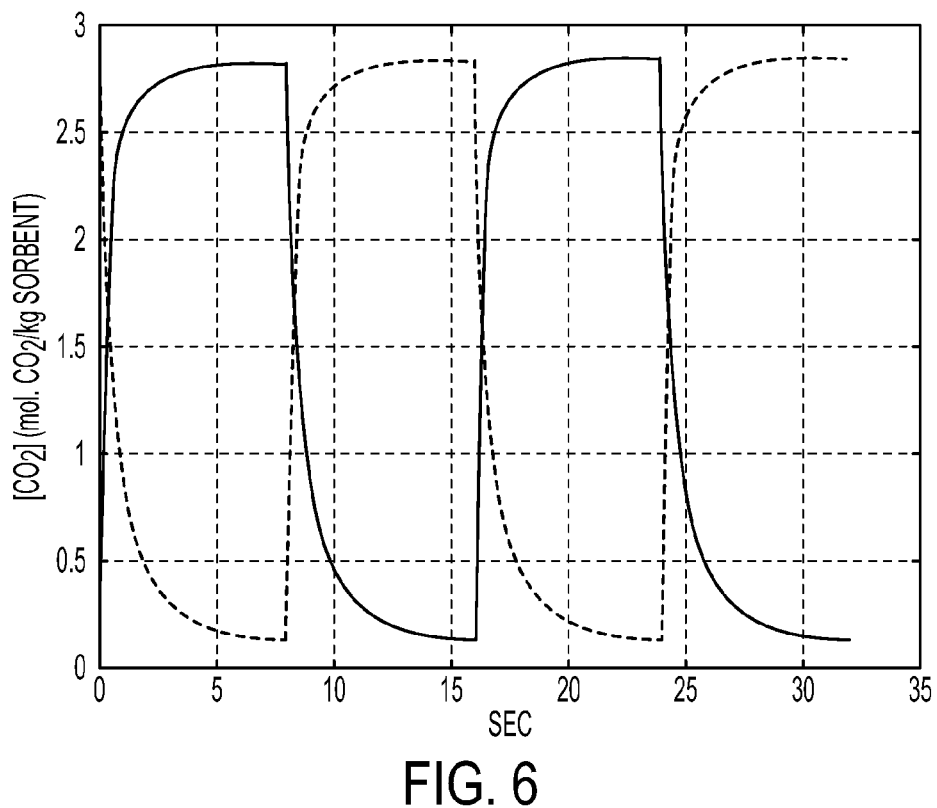
FIG. 6 graphically depicts simulated $CO_2$ adsorption data of consecutive cycles of a thermally-integrated system analogous to those of the high volumetric-efficiency thermally integrated systems according to one or more embodiments described herein.
Figure 7:
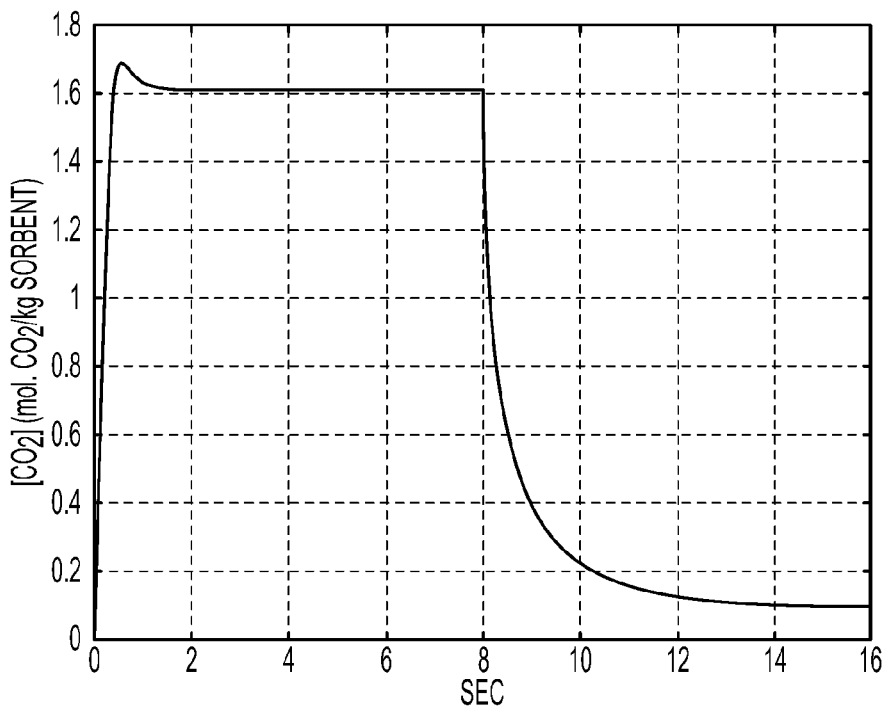
FIG. 7 graphically depicts simulated data of a non-inventive non-integrated system as a basis of comparison with the data from FIG. 6.
Figure 8:
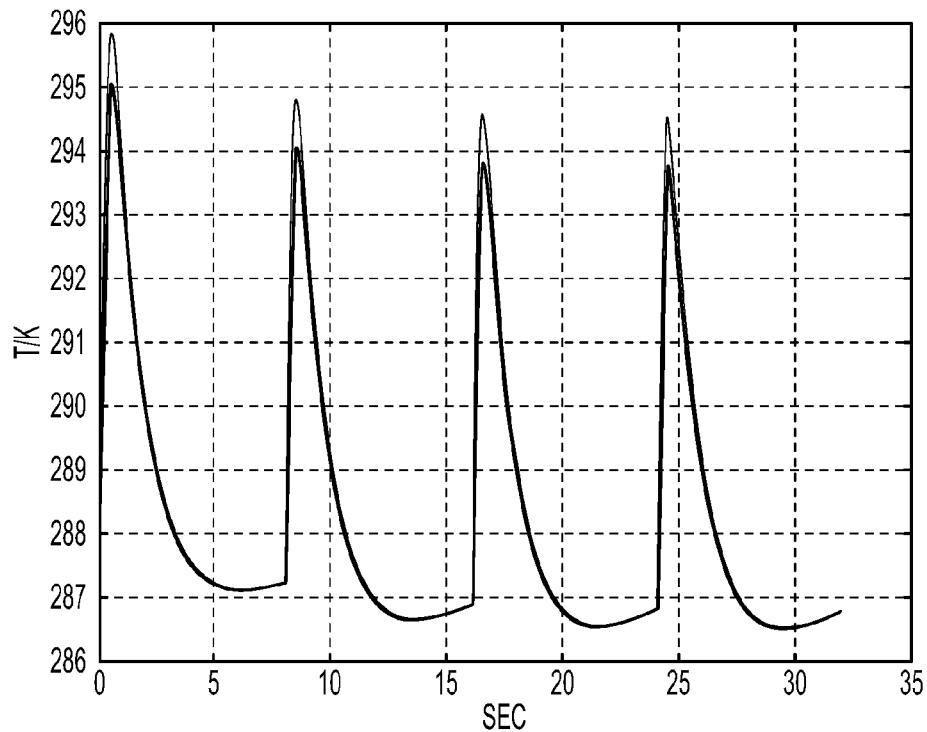
FIG. 8 graphically depicts thermal-management data of consecutive cycles of a thermally-integrated system analogous to those of the high volumetric-efficiency thermally integrated systems according to one or more embodiments described herein.
Figure 9:
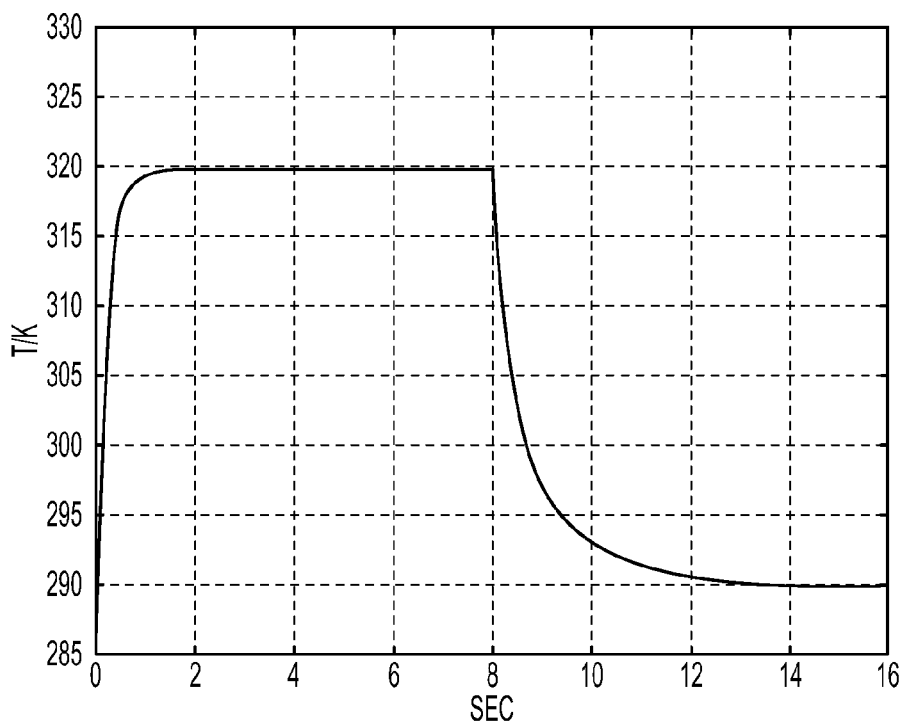
FIG. 9 graphically depicts simulated data of a non-inventive non-integrated system as a basis of comparison with the data from FIG. 8.

Model-derived data of the high volumetric-efficiency thermally integrated systems described above are provided in FIGS. 6 and 8 and are compared with similar data in FIGS. 7 and 9, respectively, from a non-inventive non-integrated system constructed without thermal management. The modeled systems were based on adsorption and desorption of carbon dioxide from sorbent surfaces of an adsorption channel in thermal communication with a desorption channel over a glass insulating layer in the place of partition walls of a monolithic body. The modeled process gas contains 12 mol. % $CO_2$, and the modeled purge gas is air having a negligible $CO_2$ content, typically about 390 ppm (0.039 mol. %). The modeled sorbent surfaces of the adsorption channel and the desorption channel were based on Zeolite 13x, having a density of 640 kg/m$^3$, a thermal conductivity of 0.12 W/m/K, a specific heat capacity of 920 J/kg/K, and a thickness of 380 μm. The modeled glass insulating layer was based on glass having a density of 2800 kg/m$^3$, a thermal conductivity of 1.05 W/m/K, a specific heat capacity of 840 J/kg/K, and a thickness of 100 μm.

In FIG. 6, simulation data for the above-described modeled system is graphically depicted. In particular, $CO_2$ concentration in the sorbent is plotted with respect to time (in seconds) for two complete cycles in a simultaneous, thermally integrated $CO_2$ adsorption and desorption process. The solid line shows a first channel and the dotted line shows a second channel neighboring the first channel. Each adsorption and desorption step, represents a cycle of consecutive first and second cycle times, each 8 seconds long. Between 0 seconds and 8 seconds in the process shown FIG. 6, the first channel is undergoing adsorption and the second channel is undergoing desorption step. From 8 seconds to 16 seconds, the processes reverse, such that the first channel is undergoing desorption and the second channel is undergoing adsorption. The cycle repeats from 16 seconds to 32 seconds. Overall, it can be seen from the equal heights of the peaks representing $CO_2$ concentration that the first channel and the second channel participate equally in the adsorption-desorption process.

In comparison, FIG. 7 shows analogous data from a non-integrated system (i.e., without channels in thermal communication) having no external thermal management such as a heat exchanger. The $CO_2$ concentration in the sorbent for one complete cycle in a $CO_2$ adsorption and desorption process is shown. The adsorption and desorption step each are conducted over 8 seconds. Between 0 seconds and 8 seconds in the process shown in FIG. 7, the channel is undergoing an adsorption step, and from 8 seconds to 16 seconds, the channel is undergoing desorption. Overall, it can be seen that, without a heat exchanger, the maximum that the bed can absorb is 1.6 moles $CO_2$ per kilogram of sorbent, instead of the 2.75 moles $CO_2$ per kilogram sorbent in the modeled thermally-integrated system according to embodiments described herein, for which data are presented in FIG. 6.

With regard to the thermal management profiles, data for the modeled thermally integrated system is provided in FIG. 8. In particular, FIG. 8 graphically depicts temperature profiles of the sorbent during two complete cycles in a $CO_2$ adsorption and desorption process. The two lines in the graph represent temperatures in a first channel and a second channel neighboring the first channel during the course of the cycles. Each adsorption and desorption step represents a cycle of consecutive first and second cycle times, each 8 seconds long. Overall, it can be seen that the temperature of both the first channel and the second channel rises initially during each adsorption or desorption step, but decreases to close to the starting temperature of 288 K at the end of each adsorption or desorption step. This ensures that the maximum capacity of sorbent is utilized during the adsorption step. The initial increase in temperature also provides momentum in the desorption process, as capacity of the sorbent to retain adsorbed $CO_2$ decreases with increase in temperature.

In comparison, FIG. 9 graphically depicts analogous data from a non-integrated system (i.e., without channels in thermal communication) having no external thermal management such as a heat exchanger. In FIG. 9, sorbent temperature over the course of one complete cycle in a $CO_2$ adsorption and desorption process is shown. Each adsorption and desorption step lasts 8 seconds. Between 0 seconds and 8 seconds, the channel is undergoing $CO_2$ adsorption, and from 8 seconds to 16 seconds, the channel is undergoing $CO_2$ desorption. Overall, it can be seen that without any thermal management in the system, the temperature of the sorbent rises from the initial temperature of 288 K to 320 K. It is believed that this sharp increase in the temperature of the sorbent directly causes the $CO_2$ capacity of the sorbent to be reduced from 2.75 moles of $CO_2$ per kilogram of sorbent in the thermally-integrated system (see FIG. 6) to 1.6 moles of $CO_2$ per kilogram of sorbent in the non-integrated system (see FIG. 7). As such, it should be understood that the high volumetric-efficiency thermally integrated systems according to various embodiments described herein provide effective thermal management and promising levels of efficiency for capturing a target gas from a process gas stream.

It should be understood that the above-described embodiments of various systems and methods refer to both a high volumetric-efficiency aspect and a thermally-integrated aspect of the systems and methods for removing a target gas from a process gas stream. The "high volumetric-efficiency" aspect of the systems and methods described herein may be realized, for example, in that all of the individual discrete channels of the monolithic body are used for conducting adsorption or desorption processes. Conversely, the high volumetric-efficiency aspect involves none of the individual channels of the monolithic body being dedicated to purposes other than conducting adsorption or desorption. Purposes other than conducting adsorption or desorption may include, for example, using certain discrete channels as coolant or heating channels, whereby thermal management of the monolithic body would occur through external sources such as liquid or gaseous media directed through the coolant or heating channels.

The "thermally-integrated" aspect of the high volumetric-efficiency thermally-integrated systems may be realized in that the first plurality of discrete channels 25 (see FIGS. 1 and 3, for example) may be arranged in direct thermal communication with the second plurality of discrete channels 35 (see FIGS. 1 and 3, for example). Thereby, when an exothermic adsorption process is conducted in the first plurality of discrete channels 25 simultaneously with an endothermic desorption process in the second plurality of discrete channels 35, heat liberated from the exothermic adsorption process can be used to directly benefit the endothermic desorption process without a need for external sources of heat.

Moreover, it should now be understood that the high volumetric-efficiency thermally integrated systems and methods described through various embodiments above may be used to capture a target gas from a process gas stream. In each of the systems and methods, a monolithic body having two pluralities of discrete channels is configured such that a process gas stream flows through one plurality of discrete channels while a purge stream flows through the other plurality of discrete channels. Concomitant processes of exothermic adsorption and endothermic desorption provide a simple but effective mechanism for thermal management of the systems embodied herein, particularly when the systems are used in conjunction with the methods described herein.

In a first aspect, the disclosure provides a high volumetric-efficiency thermally integrated system (100, 101) for capturing a target gas from a process gas stream, comprising: a monolithic body (10, 11) and a distribution system (150), wherein: the monolithic body (10, 11) comprises: a first plurality of discrete channels (25) through the monolithic body (10, 11) and parallel to a first flow axis (x) of the monolithic body (10, 11); and a second plurality of discrete channels (35) through the monolithic body (10, 11) and parallel to a second flow axis (y) of the monolithic body (10, 11); the first plurality of discrete channels (25) and the second plurality of discrete channels (35) are arranged such that individual channels (25a, 25b, 25c, 25d) of the first plurality of discrete channels (25) are in thermal communication with individual channels (35a, 35b, 35c, 35d) of the second plurality of discrete channels (35); the first plurality of discrete channels (25) are not in fluidic communication with any of the second plurality of discrete channels (35); first partition walls (22) of the first plurality of discrete channels (25) and second partition walls (32) of the second plurality of discrete channels (35) comprise sorbent surfaces (50) of a sorbent material that reversibly adsorbs the target gas from the process gas stream; and the high volumetric-efficiency thermally integrated system (100, 101) switches between a first state in which the distribution system (150) simultaneously supplies a process gas stream to the second plurality of discrete channels (35) and a purge stream to the first plurality of discrete channels (25) and a second state in which the distribution system (150) simultaneously supplies the process gas stream to the first plurality of discrete channels (35) and the purge stream to the second plurality of discrete channels (25).

In a second aspect the disclosure provides the high volumetric-efficiency thermally integrated system (100, 101) of aspect 1, wherein the first flow axis (x) is perpendicular to the second flow axis (y).

In a third aspect, the disclosure provides the high volumetric-efficiency thermally integrated system (100, 101) of aspect one or aspect 2, wherein the distribution system (150) comprises switchable valves (180a, 180b, 180c, 180d) that switch the high-volumetric-efficiency thermally integrated system (100, 101) from the first state to the second state or from the second state to the first state, such that the high volumetric-efficiency thermally integrated system (100, 101) is a static system (100).

In a fourth aspect, the disclosure provides the high volumetric-efficiency thermally integrated system (100, 101) of any one of aspects 1-3, further comprising a rotational mechanism that rotates the monolithic body (10, 11) about a rotational axis (z) perpendicular to the first flow axis (x) and the second flow axis (y) such that the high volumetric-efficiency thermally integrated system (100, 101) is a dynamic system (101) and, by the rotation of the monolithic body (10, 11) about the rotational axis (z), switches the dynamic system (101) from the first state to the second state or from the second state to the first state.

In a fifth aspect the disclosure provides the high volumetric-efficiency thermally integrated system (100, 101) of claim 1, wherein: the target gas is selected from the group consisting of carbon dioxide and hydrogen sulfide; and the sorbent material is selected from the group consisting of zeolites, zeolitic imadazole frameworks, metallic organic frameworks, carbon, mesoporous aluminas, mesoporous silicas, amine functionalized variants thereof, amino-group functionalized variants thereof, and combinations thereof.

In an sixth aspect, the disclosure provides a method for separating a target gas from a process gas stream using a high volumetric-efficiency thermally integrated system (100, 101) having a monolithic body (10, 11), the method comprising: flowing the process gas stream through a first plurality of discrete channels (25) formed in the monolithic body (10, 11), so as to cause the target gas to adsorb into sorbent surfaces (50) of the first plurality of discrete channels (25); and performing a thermally integrated first stage for a first cycle time, the thermally integrated first stage comprising simultaneously: flowing the process gas stream through a second plurality of discrete channels (35) formed in the monolithic body (10, 11), so as to cause the target gas to adsorb exothermically into sorbent surfaces (50) of the second plurality of discrete channels (35), wherein the second plurality of discrete channels (35) and the first plurality of discrete channels (25) are arranged such that individual channels (35a, 35b, 35c, 35c) of the second plurality of discrete channels (35) are in thermal communication with individual channels (25a, 25b, 25c, 25d) of the first plurality of discrete channels (25), and wherein the second plurality of discrete channels (35) are not in fluidic communication with any of the first plurality of discrete channels (25); and purging the first plurality of discrete channels (25) with a flowing purge stream, so as to cause the target gas to desorb endothermically from the sorbent surfaces (50) of the first plurality of discrete channels (25) and enter into the flowing purge stream.

In a seventh aspect, the disclosure provides the method of aspect 6, wherein each discrete first channel (25a, 25b, 25c, 25d) is parallel to a first flow axis (x) of the monolithic body (10, 11) and each discrete second channel (35a, 35b, 35c, 35d) is parallel to a second flow axis (y) of the monolithic body (10, 11).

In an eighth aspect, the disclosure provides the method of aspect 6 or 7, further comprising: performing a thermally integrated second stage for a second cycle time, the thermally integrated second stage comprising simultaneously: flowing the process gas stream through the first plurality of discrete channels (25), so as to cause the target gas to adsorb exothermically into the sorbent surfaces (50) of the first plurality of discrete channels (25); purging the second plurality of discrete channels (35) with a flowing purge stream, so as to cause the target gas to desorb endothermically from the sorbent surfaces (50) of the second plurality of discrete channels (35) and enter into the flowing purge stream.

In a ninth aspect, the disclosure provides the method of aspect 8, wherein the high volumetric-efficiency system (100, 101) further comprises: a process gas source (160) that delivers the process gas to the monolithic body (10, 11), the process gas source (160) being in fluidic communication with only the second plurality of discrete channels (35) during the thermally integrated first stage and with only the first plurality of discrete channels (25) during the thermally integrated second stage; and a purge source (170) that delivers the purge stream to the monolithic body (10, 11), the purge source being in fluidic communication with only the first plurality of discrete channels (25) during the thermally integrated first stage and with only the second plurality of discrete channels (35) during the thermally integrated second stage.

In a tenth aspect, the disclosure provides the method of aspect 9, further comprising cycling between the thermally integrated first stage and the thermally integrated second stage.

In an eleventh aspect, the disclosure provides the method of aspect 10, wherein cycling between the thermally integrated first stage and the thermally integrated second stage comprises in sequence: performing the thermally integrated first stage; rotating the monolithic body (10, 11) about a rotational axis (z) perpendicular to the first flow axis (x) and the second flow axis (y) to place the first plurality of discrete channels (25) in fluidic communication with the process gas source (160) and to place the second plurality of discrete channels (35) in fluidic communication with the purge source (170); performing the thermally integrated second stage; and rotating the monolithic body (10, 11) about the rotational axis (z) to place the second plurality of discrete channels (35) in fluidic communication with the process gas source (160) and to place the first plurality of discrete channels (25) in fluidic communication with the purge source (170).

In a twelfth aspect, the disclosure provides the method of aspect 11, wherein the first flow axis (x) is perpendicular to the second flow axis (y).

In a thirteenth aspect, the disclosure provides the method of aspect 6, wherein the process gas stream is selected from the group consisting of natural gas, flue gas, air, biogas, a water gas-shift mixture from a hydrogen gas production process, and exhaust gas from a combustion process.

In a fourteenth aspect, the disclosure provides the method of aspect 6, wherein the target gas is selected from the group consisting of carbon dioxide and hydrogen sulfide.

In a fifteenth aspect, the disclosure provides the method of aspect 6, wherein the target gas is carbon dioxide.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A high volumetric-efficiency thermally integrated system for capturing a target gas from a process gas stream, comprising:
   a monolithic body and a distribution system, wherein:
      the monolithic body comprises:
         a first monolith comprising a first plurality of discrete channels through the first monolith and parallel to a first flow axis of the monolithic body; and
         a second monolith adjacent to the first monolith and comprising a second plurality of discrete channels through the second monolith and parallel to a second flow axis of the monolithic body;
      the first plurality of discrete channels and the second plurality of discrete channels are arranged such that individual channels of the first plurality of discrete channels are in thermal communication with individual channels of the second plurality of discrete channels;
      the first plurality of discrete channels are not in fluidic communication with any of the second plurality of discrete channels;
      first partition walls of the first plurality of discrete channels and second partition walls of the second plurality of discrete channels comprise sorbent surfaces of a sorbent material that reversibly adsorbs the target gas from the process gas stream;
      the high volumetric-efficiency thermally integrated system is reversibly switchable between:
         a first state in which the distribution system simultaneously supplies the process gas stream to the second plurality of discrete channels and a purge stream to the first plurality of discrete channels, the target gas being adsorbed from the process gas stream in the second plurality of discrete channels while being desorbed into the purge stream in the first plurality of discrete channels; and
         a second state in which the distribution system simultaneously supplies the process gas stream to the first plurality of discrete channels and the purge stream to the second plurality of discrete channels, the target gas being adsorbed from the process gas stream in the first plurality of discrete channels while being desorbed into the purge stream in the second plurality of discrete channels.

2. The high volumetric-efficiency thermally integrated system of claim 1, wherein the first flow axis is perpendicular to the second flow axis.

3. The high volumetric-efficiency thermally integrated system of claim 1, wherein the distribution system comprises switchable valves that switch the high-volumetric-efficiency thermally integrated system from the first state to the second state or from the second state to the first state, such that the high volumetric-efficiency thermally integrated system is a static system.

4. The high volumetric-efficiency thermally integrated system of claim 1, further comprising a rotational mechanism that rotates the monolithic body about a rotational axis perpendicular to the first flow axis and the second flow axis such that the high volumetric-efficiency thermally integrated system is a dynamic system and, by the rotation of the monolithic body about the rotational axis, switches the high-volumetric-efficiency system from the first state to the second state or from the second state to the first state.

5. The high volumetric-efficiency thermally integrated system of claim 1, wherein:
   the target gas is selected from the group consisting of carbon dioxide and hydrogen sulfide; and
   the sorbent material is selected from the group consisting of zeolites, zeolitic imadazole frameworks, metallic organic frameworks, carbon, mesoporous aluminas, mesoporous silicas, amine functionalized variants thereof, amino-group functionalized variants thereof, and combinations thereof.

6. The high volumetric-efficiency thermally integrated system of claim 5, wherein the sorbent material is amine functionalized or amino-group functionalized.

7. The high volumetric-efficiency thermally integrated system of claim 5, wherein the sorbent material is selective to at least one of carbon dioxide or hydrogen sulfide.

8. The high volumetric-efficiency thermally integrated system of claim 1, wherein:
   in the first state, the target gas in the process gas stream adsorbs onto the sorbent material of the second partition walls and heat from the adsorption benefits a desorption of the target gas from the sorbent material of the first partition walls into the purge gas stream in the first plurality of discrete channels; and in the second state, the target gas in the process gas stream adsorbs onto the sorbent material of the first partition walls and heat from the adsorption benefits a desorption of the target gas from the sorbent material of the second partition walls into the purge gas stream in the second plurality of discrete channels.

9. The high volumetric-efficiency thermally integrated system of claim 1, wherein all of the individual discrete channels of the monolithic body are simultaneously dedicated either to conducting adsorption of the target gas from the process gas stream onto sorbent material with liberation of heat or to conducting desorption of the target gas from sorbent material while benefiting from the heat liberated from the simultaneous adsorption.

10. The high volumetric-efficiency thermally integrated system of claim 1, further comprising a first exhaust system and a second exhaust system.

11. The high volumetric-efficiency thermally integrated system of claim 10, wherein the distribution system comprises switchable valves that switch the high-volumetric-efficiency thermally integrated system from the first state to the second state or from the second state to the first state.

12. The high volumetric-efficiency thermally integrated system of claim 11, wherein:

in the first state, the first exhaust system receives the process gas stream less any amount of target gas adsorbed in the monolithic body and the second exhaust system receives the purge gas stream containing target gas desorbed from the monolithic body; and in the second state, the second exhaust system receives the process gas stream less any amount of target gas adsorbed in the monolithic body and the first exhaust system receives the purge gas stream containing target gas desorbed from the monolithic body.

13. The high volumetric-efficiency thermally integrated system of claim 10, further comprising a rotational mechanism that rotates the monolithic body about a rotational axis perpendicular to the first flow axis and the second flow axis and, by the rotation of the monolithic body about the rotational axis, switches the high-volumetric-efficiency thermally integrated system from the first state to the second state or from the second state to the first state.

14. The high volumetric-efficiency thermally integrated system of claim 13, wherein:

in both the first state and the second state, the first exhaust system receives the process gas stream less any amount of target gas adsorbed in the monolithic body; and in both the first state and the second state, the second exhaust system receives the purge gas stream containing target gas desorbed from the monolithic body.

15. The high volumetric-efficiency thermally integrated system of claim 10, wherein at least one of the first exhaust system or the second exhaust system comprises a mechanism for collecting the target gas from the purge gas stream.

16. A high volumetric-efficiency thermally integrated system for capturing a target gas from a process gas stream, comprising:

a monolithic body and a distribution system, wherein:
the monolithic body comprises:
a first plurality of discrete channels through the monolithic body and parallel to a first flow axis of the monolithic body; and
a second plurality of discrete channels through the monolithic body and parallel to a second flow axis of the monolithic body;

the first plurality of discrete channels and the second plurality of discrete channels are arranged such that individual channels of the first plurality of discrete channels are in thermal communication with individual channels of the second plurality of discrete channels;

the first plurality of discrete channels are not in fluidic communication with any of the second plurality of discrete channels;

the monolithic body is constructed from a sorbent material that reversibly adsorbs the target gas from the process gas stream; and the distribution system simultaneously supplies the process gas stream to one of the first plurality of discrete channels or the second plurality of discrete channels while supplying a purge gas stream to the other of the first plurality of discrete channels and the second plurality of discrete channels;

all of the individual discrete channels of the monolithic body are simultaneously dedicated either to conducting adsorption of the target gas from the process gas stream onto sorbent material with liberation of heat or to conducting desorption of the target gas from sorbent material while benefiting from the heat liberated from the simultaneous adsorption.

17. The high volumetric-efficiency thermally integrated system of claim 16, wherein the first flow axis is perpendicular to the second flow axis.

18. The high volumetric-efficiency thermally integrated system of claim 16, wherein:

the target gas is selected from the group consisting of carbon dioxide and hydrogen sulfide; and the sorbent material is selected from the group consisting of zeolites, zeolitic imidazole frameworks, metallic organic frameworks, carbon, mesoporous aluminas, mesoporous silicas, amine functionalized variants thereof, amino-group functionalized variants thereof, and combinations thereof.

19. The high volumetric-efficiency thermally integrated system of claim 16, wherein:

the high volumetric-efficiency thermally integrated system is reversibly switchable between a first state in which the distribution system simultaneously supplies the process gas stream to the second plurality of discrete channels and a purge stream comprising a purge concentration of the target gas less than the process concentration to the first plurality of discrete channels and a second state in which the distribution system simultaneously supplies the process gas stream to the first plurality of discrete channels and the purge stream to the second plurality of discrete channels.

20. The high volumetric-efficiency thermally integrated system of claim 19, wherein:

in the first state, the target gas in the process gas stream adsorbs onto the sorbent material of the second partition walls and heat from the adsorption benefits a desorption of the target gas from the sorbent material of the first partition walls into the purge gas stream in the first plurality of discrete channels; and in the second state, the target gas in the process gas stream adsorbs onto the sorbent material of the first partition walls and heat from the adsorption benefits a desorption of the target gas from the sorbent material of the second partition walls into the purge gas stream in the second plurality of discrete channels.

21. The high volumetric-efficiency thermally integrated system of claim 19, further comprising a first exhaust system and a second exhaust system, and wherein:
- the distribution system comprises switchable valves that switch the high-volumetric efficiency thermally integrated system from the first state to the second state or from the second state to the first state;
- in the first state, the first exhaust system receives the process gas stream less any amount of target gas adsorbed in the monolithic body and the second exhaust system receives the purge gas stream containing target gas desorbed from the monolithic body; and
- in the second state, the second exhaust system receives the process gas stream less any amount of target gas adsorbed in the monolithic body and the first exhaust system receives the purge gas stream containing target gas desorbed from the monolithic body.

22. The high volumetric-efficiency thermally integrated system of claim 19, further comprising:
- a rotational mechanism that rotates the monolithic body about a rotational axis perpendicular to the first flow axis and the second flow axis and, by the rotation of the monolithic body about the rotational axis, switches the high-volumetric efficiency thermally integrated system from the first state to the second state or from the second state to the first state;
- a first exhaust system; and
- a second exhaust system, and wherein:
- in both the first state and the second state, the first exhaust system receives the process gas stream less any amount of target gas adsorbed in the monolithic body; and
- in both the first state and the second state, the second exhaust system receives the purge gas stream containing target gas desorbed from the monolithic body.

23. The high volumetric-efficiency thermally integrated system of claim 1, wherein each of the first monolith and the second monolith comprises a ceramic material.

* * * * *